(12) United States Patent
Miyashita et al.

(10) Patent No.: US 7,023,504 B2
(45) Date of Patent: *Apr. 4, 2006

(54) ELECTRO-OPTICAL DEVICE ENCASED IN MOUNTING CASE, PROJECTION DISPLAY APPARATUS, AND MOUNTING CASE

(75) Inventors: Tomoaki Miyashita, Shimosuwa-machi (JP); Hiroyuki Kojima, Suwa (JP); Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 10/728,778

(22) Filed: Dec. 8, 2003

(65) Prior Publication Data

US 2004/0169784 A1    Sep. 2, 2004

(30) Foreign Application Priority Data

Dec. 20, 2002   (JP) ............................. 2002-370069

(51) Int. Cl.
*G02F 1/1335* (2006.01)
*G02F 1/1333* (2006.01)

(52) U.S. Cl. ............................. 349/58; 349/5; 349/158; 349/161; 361/600; 362/294

(58) Field of Classification Search .................... 349/5, 349/58, 158, 161; 361/600; 362/294
See application file for complete search history.

(56) References Cited

U.S. PATENT DOCUMENTS

| | | | |
|---|---|---|---|
| 5,653,522 A | 8/1997 | Loucks | |
| 5,835,179 A | 11/1998 | Yamanaka | |
| 5,988,818 A * | 11/1999 | Fujimori et al. | 353/119 |
| 6,819,464 B1 * | 11/2004 | Fujimori et al. | 359/246 |
| 2002/0015119 A1 * | 2/2002 | Takizawa | 349/58 |
| 2005/0073623 A1 * | 4/2005 | Tsuo et al. | 349/58 |

FOREIGN PATENT DOCUMENTS

| | | |
|---|---|---|
| JP | 03-149521 | 6/1991 |
| JP | 04-125538 | 4/1992 |
| JP | 6-67143 | 3/1994 |
| JP | 6-55134 | 7/1994 |
| JP | 7-248480 | 9/1995 |
| JP | 9-502313 | 3/1997 |
| JP | 10-54977 | 2/1998 |
| JP | 10-68935 | 3/1998 |
| JP | 10-123964 | 5/1998 |
| JP | 10-168424 | 6/1998 |
| JP | A1 WO98/36313 | 8/1998 |
| JP | 10-232629 | 9/1998 |
| JP | 10-319379 | 12/1998 |

(Continued)

*Primary Examiner*—Huyen Ngo
(74) *Attorney, Agent, or Firm*—Oliff & Berridge, PLC

(57) ABSTRACT

Provided is an electro-optical device encased in a mounting case including an electro-optical device having a substrate in which projection light from a light source is incident on an image display region, and a mounting case including a plate disposed to face one surface of the electro-optical device and a cover to cover the electro-optical device, a portion of the cover abutting against the plate, and the mounting case accommodating the electro-optical device by holding at least a portion of the peripheral region positioned at the periphery of the image display region of the electro-optical device with at least one of the plate and the cover. Also, the plate has a coefficient of linear expansion within a predetermined range on the basis of the coefficient of linear expansion of the substrate.

10 Claims, 11 Drawing Sheets

FOREIGN PATENT DOCUMENTS

| | | |
|---|---|---|
| JP | 11-84337 | 3/1999 |
| JP | 11-84350 | 3/1999 |
| JP | 11-95197 | 4/1999 |
| JP | 2000-75258 | 3/2000 |
| JP | 2000-147472 | 5/2000 |
| JP | 2000-180957 | 6/2000 |
| JP | 2000-298262 | 10/2000 |
| JP | 2001-195006 | 7/2001 |
| JP | 2001-290120 | 10/2001 |
| JP | 2001-311825 | 11/2001 |
| JP | 2001-318361 | 11/2001 |
| JP | 2002-207207 | 7/2002 |
| JP | 2002-244207 | 8/2002 |
| JP | 2002-244214 | 8/2002 |
| JP | 2002-258241 | 9/2002 |
| JP | 2002-296568 | 10/2002 |
| JP | 2002336902 A * | 11/2002 |
| JP | A-2004-45680 | 2/2004 |

* cited by examiner

F I G. 1
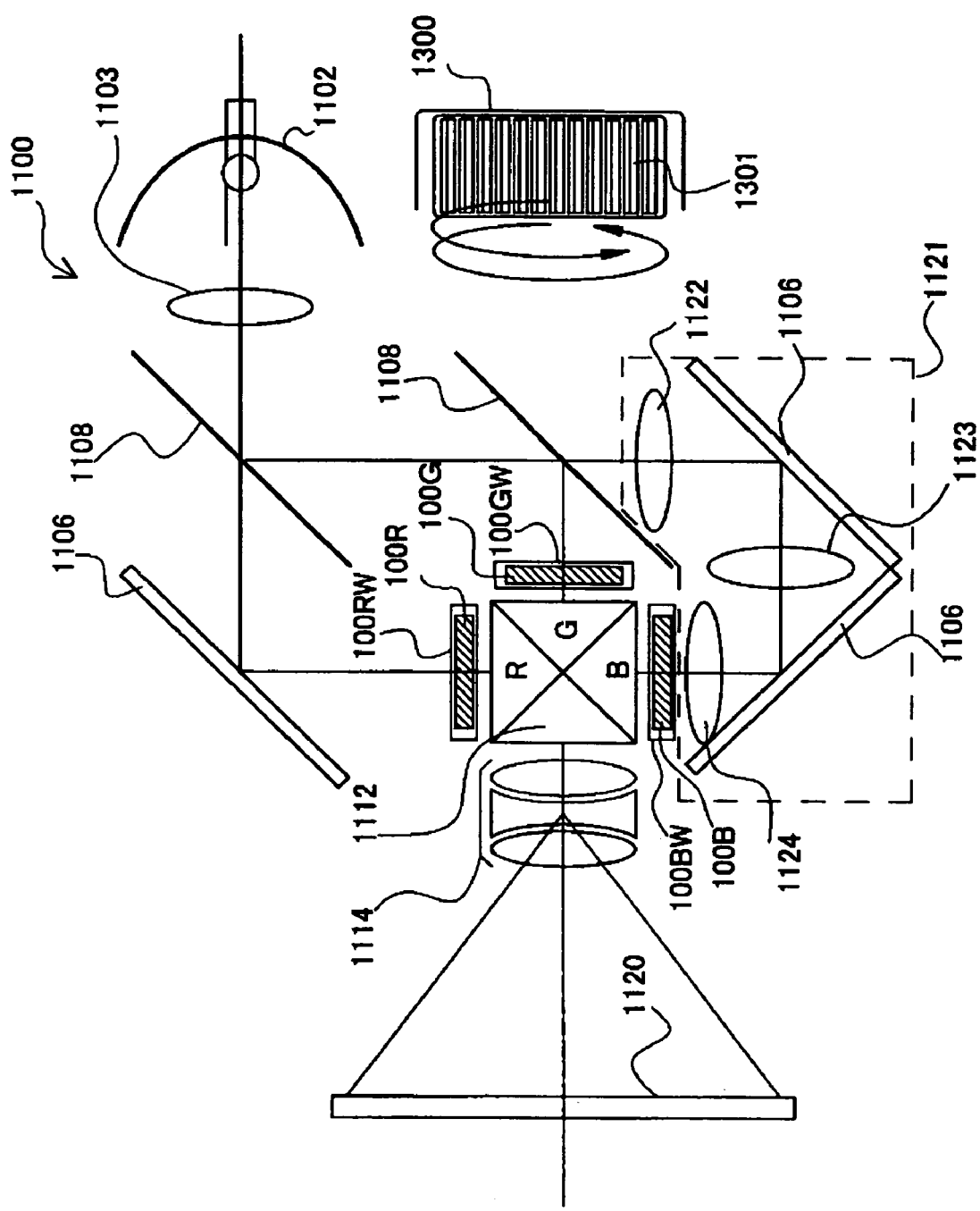

F I G. 1 0
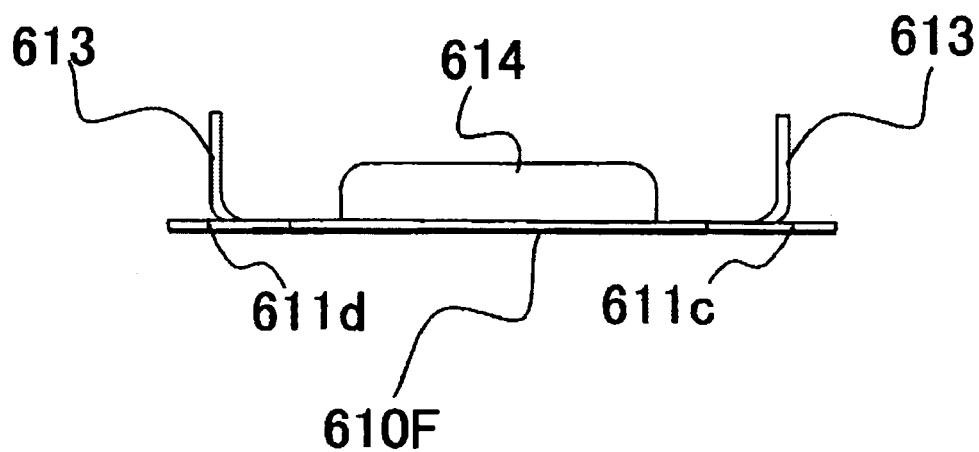
F I G. 1 1
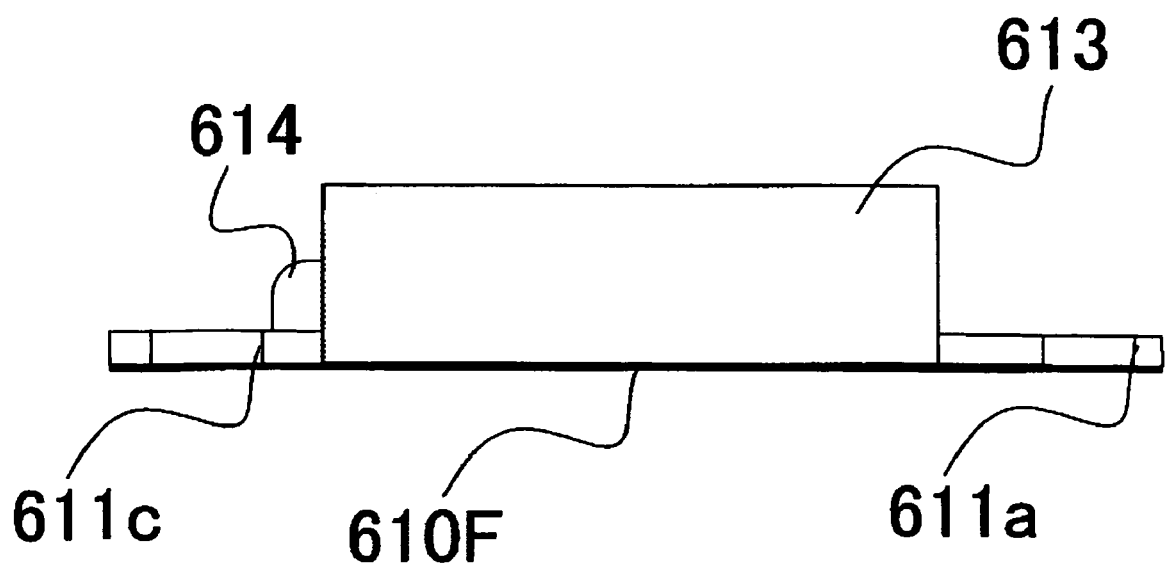

ELECTRO-OPTICAL DEVICE ENCASED IN MOUNTING CASE, PROJECTION DISPLAY APPARATUS, AND MOUNTING CASE

BACKGROUND OF THE INVENTION

1. Field of Invention

The present invention relates to a mounting case accommodating an electro-optical device, such as a liquid crystal panel, which is used as a light valve of a projection display apparatus, such as a liquid crystal projector, a method to manufacture the mounting case, an electro-optical device in a mounting case, in which the electro-optical device is accommodated or encased in the mounting case, and a projection display apparatus including the electro-optical device encased in the mounting case.

2. Description of Related Art

In the related art, generally, when a liquid crystal panel is used as a light valve of a liquid crystal projector, the liquid crystal panel is not provided in an exposed state on a console, etc., constituting the liquid crystal projector, but it is accommodated or encased in a suitable mounting case. Then the mounting case including the liquid crystal panel is provided on the console. This is because the liquid crystal panel can be easily fixed or attached to the console by suitable screw holes provided in the mounting case.

In the liquid crystal projector, source light emitted from a light source is projected on the liquid crystal panel in the mounting case as focused light. Light having passed through the liquid crystal panel is magnified and projected on a screen to display images. In this way, since the magnified projection is generally predetermined in the liquid crystal projector, relatively intensive light emitted from a light source, such as a metal halide lamp is used.

However, in this construction, first, there is a problem in that the temperature of the liquid crystal panel in the mounting case, particularly of the liquid crystal panel, rises. The rise in temperature causes the rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then the deviation of its transmittance is generated by the so-called hot spots. Thus, the quality of projected images deteriorates.

Techniques for preventing the rise in temperature of the liquid crystal panel include an approach for preventing the rise in temperature of the liquid crystal panel by providing a radiating sheet between the liquid crystal panel and a radiating plate in a liquid crystal display module including the liquid crystal panel and a package for holding and accommodating the liquid crystal panel and having the radiating plate. In addition, technology, such as reducing incidence of unnecessary infrared rays by arranging heat ray cut-off filters between light sources and a liquid crystal panel or by air-cooling or water-cooling the liquid crystal panel is known.

However, the related art approaches for preventing the rise in temperature of the liquid crystal panel have the following problems. As long as intensive light is emitted from the light source, the problem of the rise in temperature of the liquid crystal panel may occur at any time. Therefore, in order to obtain still higher image quality, more effective measures to prevent the rise in temperature are required instead of or in addition to the aforementioned approaches.

Further, in the aforementioned liquid crystal panel encased in a mounting case, the relationship between the liquid crystal panel and the mounting case also cause problems other than the problem of the rise in temperature in the liquid crystal panel itself. That is, the transparent substrate constituting a liquid crystal panel is made of, for example, quartz glass or neoceram having a relatively small coefficient of linear expansion while the mounting case is made of, for example, metals having relatively large coefficients of linear expansion. However, the mounting case may expand more than the transparent substrate even when they are radiated with the same light (energy radiation). Therefore, depending on the expansion of the mounting case, the liquid crystal panel, which is to be accommodated at a predetermined location in the mounting case, may cause dislocation. As a result, it is difficult to perform an accurate enlargement projection on a screen because the liquid crystal panel is dislocated from a focus point of light sources.

On the other hands, if attention is paid to the above-described difference between the coefficients of linear expansion, there is a problem that may occur when the liquid crystal projector is used in a low temperature atmosphere or during a cooling-off process. That is, the mounting case having a larger coefficient of linear expansion contracts more than the transparent substrate having a smaller coefficient of linear expansion. Due to this construction, the liquid crystal projector receives unnecessary force from the mounting case. As a result, an optical anisotropy may be generated in the liquid crystal panel, thereby forming irregular color on an image. Additionally, this problem frequently occurs especially when the liquid crystal projector is used in an environment of less than 10° C.

SUMMARY OF THE INVENTION

The present invention has been achieved in view of the aforementioned problems. The present invention provides an electro-optical device encased in a mounting case, which can display high quality images regardless of ambient temperature, and a projection display apparatus including the electro-optical device. Also, the present invention provides a mounting case and a method to manufacture the same, which can accomplish the above.

In order to achieve the above, an electro-optical device encased in a mounting case of an aspect of the present invention includes an electro-optical device having a substrate in which projection light from a light source is incident on an image display region, and a mounting case including a plate disposed to face one surface of the electro-optical device and a cover to cover the electro-optical device, a portion of the cover abutting against the plate, the mounting case accommodating the electro-optical device by holding at least a portion of a peripheral region positioned at the periphery of the image display region of the electro-optical device with at least one of the plate and the cover. The plate has a coefficient of linear expansion within a predetermined range based on the coefficient of linear expansion of the substrate.

According to the electro-optical device encased in the mounting case of an aspect of the present invention, the electro-optical device having the image display region to which the light emitted from the light source is incident, is accommodated into the mounting case. The electro-optical device includes, for example, a liquid crystal device or a liquid crystal panel which is mounted as a light valve of a projection display apparatus. In addition, the mounting case may have an additional function, such as a light shielding function to prevent the leakage of light in the peripheral region of the electro-optical device or the influx of the stray light from the peripheral region to the image display region by partially covering at least a portion of the peripheral region of the electro-optical device.

In an aspect of the present invention, particularly, the plate has a coefficient of linear expansion within a predetermined range based on the coefficient of linear expansion of the substrate. For example, the substrate is made of, for example, quartz glass having a coefficient of linear expansion ranging from about 0.3 to $0.6 \times 10^{-6} [/^\circ C.]$ or neoceram having a coefficient of linear expansion ranging from about $-0.85$ to $-0.65 \times 10^{-6} [/^\circ C.]$ when the electro-optical device is assumed to be stored at a temperature ranging from $-30$ to $80^\circ$ C. Also, in an aspect of the present invention, the coefficient of linear expansion of a material constituting the plate ranges within a predetermined range. Here, the "predetermined range" means a range of the coefficient of linear expansion which does not cause dislocation of the electro-optical device in the mounting case. More preferably, the predetermined range means that the substrate has almost the same coefficient of linear expansion as that of the plate.

Accordingly, according to an aspect of the present invention, the plate and the electro-optical device which may abut against at least a portion of the plate expand or contract alike if they are under the same thermal atmosphere. Thus, first, it is possible to reduce or prevent the electro-optical device from being compressed by the considerably contracted plate, as supposed in a case that the coefficient of linear expansion of the plate is larger than that of the substrate, and the ambient temperature is low. Further, second, it is possible to avoid the dislocation of the electro-optical device with respect to the plate, as supposed in a case that the ambient temperature is high. In other words, according to an aspect of the present invention, the problems described in the related art can be greatly suppressed.

Therefore, in an aspect of the present invention, it is possible to suppress a situation in which irregular color may occurs on an image due to the action of a compressive force to the electro-optical device, which is concerned particularly in a low temperature environment, and it is possible to suppress a situation in which dislocation of the electro-optical device occurs, which is concerned particularly in a high temperature environment.

More specifically, according to the present inventors' research, it has been confirmed that an appropriate image can be displayed in an extremely wide range of temperature ranging from $-10$ to $80^\circ$ C.

Moreover, the plate according to an aspect of the present invention has relatively large heat conductivity in addition to the characteristics related to the aforementioned coefficient of linear expansion. The large heat conductivity enables the plate to effectively serve as a heat sink which takes heat away from the electro-optical device when the temperature of the electro-optical device rises by the incidence of the projection light.

Further, in addition to the above case, the cover is preferably made of a material, such as aluminum, magnesium, copper, or alloy thereof, each having a relatively large heat conductivity. Accordingly, the heat taken away from the electro-optical device by the plate is transferred to the cover which abuts against a portion of the plate, and finally scattered from the cover to the outside. As a result, the rise in temperature of the electro-optical device can be effectively reduced or prevented.

In an aspect of the electro-optical device encased in a mounting case of an aspect of the present invention, the predetermined range is $\pm 5 \times 10^{-6} [/^\circ C.]$.

According to the above aspect, since the relationship between the coefficients of linear expansion of the plate and the substrate is properly set, the above-described effect may be more effectively fulfilled. That is, since the plate contracts or expands more easily than the substrate if the coefficient exceeds the above-described range, irregular color is easily generated on an image or dislocation of the electro-optical device is easily generated. For example, according to the present inventors' research, the problems, such as irregular color and dislocation appear remarkably when the plate is made of aluminum alloy having the coefficient of linear expansion ranging from about 20 to $25 \times 10^{-6} [/^\circ C.]$ and the substrate is made of quartz glass having the above coefficient of linear expansion. In such case, the plate has a larger coefficient of linear expansion than the substrate by about 15 to about $20 \times 10^{-6} [/^\circ C.]$.

Moreover, the material satisfying the conditions related to the present aspect includes copper and tungsten alloys (Cu—W alloy) or ceramic materials including alumina ($Al_2O_3$) and silica ($SiO_2$) in addition to alloys including at least iron and nickel, which will be described later.

When the restriction related to the present aspect is further made on the coefficient of linear expansion possessed by the aforementioned various alloys, the predetermined range of the coefficient of linear expansion is more preferably set to $\pm 2.5 \times 10^{-6} [/^\circ C.]$.

In another aspect of the electro-optical device encased in the mounting case of the present invention, the plate is made of alloy including at least iron and nickel.

According to the above aspect, the plate is made of alloy including at least iron and nickel, specifically, so-called invar alloy such as 36Ni—Fe alloy and 42Ni—Fe alloy, or COVAR alloy (e.g. 32Ni-5Co—Fe alloy, 29Ni-17Co—Fe alloy, etc.). Of such alloys, 36Ni—Fe alloy has a coefficient of linear expansion of about $1.2 \times 10^{-6} [/^\circ C.]$, 32Ni-5Co—Fe alloy has a coefficient of linear expansion of about $0.1 \times 10^{-6} [/^\circ C.]$, and 29Ni-17Co—Fe alloy has a coefficient of linear expansion of about $5.0 \times 10^{-6} [/^\circ C.]$. If the plate is made of materials having such relatively small coefficients of linear expansion, the effects of the aspects of the present invention will be further enjoyed effectively.

In another aspect of the electro-optical device encased in the mounting case of the present invention, the plate is formed by a press process.

According to the above aspect, since the plate is formed by a press process, the shape of the plate can be more precisely controlled in comparison to when the plate is formed by, for example, a sintering process. That is, measurement expedience may be easily performed, and the plate can be more cheaply formed. Additionally, according to the press process related to the present aspect, a processing related to a mounting surface on which an electro-optical device is put, and the provision of a three-dimensional shape allowing the electro-optical device to be properly installed in a housing constituting a projection display apparatus can be performed.

In this exemplary embodiment, particularly, an annealing process is preferably performed on the plate before the press process.

According to the above construction, the press process may be easily performed even on materials which are relatively difficult to handle, thereby reducing manufacture cost. Incidentally, the hard-handling materials typically include the aforementioned alloy containing iron and nickel.

In another exemplary embodiment of the electro-optical device encased in a mounting case of an aspect of the present invention, a light emitting surface of the plate is a black.

According to the above aspect, since the light emitting surface of the plate is black, light can be reduced or prevented from being reflected on the light emitting surface. Accordingly, it is possible to reduce or prevent light reflected from the pertinent surface from being mixed on an image beforehand, and it is possible to display higher quality of image.

Moreover, in the above aspect, a light incidence surface of the plate may be black besides the light emitting surface. This construction can reduce or prevent light from entering the electro-optical device from the light emitting surface of the electro-optical device, which should not basically occur. Accordingly, when the electro-optical device includes, for example, a substrate having a semiconductor element whose characteristics are changed due to so-called light leak current, light can be previously reduced or prevented from entering the semiconductor element, and the characteristics of the semiconductor element are maintained well. Additionally, it is also possible to reduce or prevent the aforementioned reflected light from being again reflected by the electro-optical device, and thereby the pertinent light from being finally mixed into the image.

Further, in order to make the light emitting surface of the plate black, plating or painting treatment is preferably performed on the surface of the plate.

In another aspect of the electro-optical device encased in a mounting case, the substrate includes a pair of substrates to hold an electro-optical material therebetween, and at least one dustproof substrate provided in one of the pair of substrates on the surface not facing the electro-optical material.

According to the above aspect, particularly, the electro-optical device, may possibly include a dustproof substrate in addition to the pair of substrates to hold an electro-optical material, such as liquid crystal layers therebetween, for example, a TFT array substrate having TFTs as switching devices in a matrix, and a counter substrate. The dustproof substrate reduces or prevents dirt or dust around the electro-optical device from being directly stuck onto the surface of the electro-optical device. Therefore, it is possible to effectively remove a defect that a figure of dirt or dust appears on the magnified projection image. Since the dustproof substrate has the predetermined thickness, the dustproof substrate has a defocusing function to deviate the focus of the source light or the vicinity thereof from a location where dirt or dust exists, that is, from the surface of the dustproof substrate.

In the present aspect, particularly, the substrate is the pair of substrates and at least one dustproof substrate. Accordingly, for example, when the dustproof substrate is directly abutted against the plate, what coefficient of linear expansion the dustproof substrate has is an important factor of whether the aforementioned problems may occur. This is because it is conceivable that the dustproof substrate first is directly affected, when the deformation, such as the thermal expansion or contraction in the plate, is produced in such a case. However, in the present aspect, the substrate also includes the dustproof substrate. Accordingly, since the coefficients of linear expansion of the dustproof substrate and the plate are adjusted beforehand within a predetermined range, the occurrence of the aforementioned problems can be reduced or prevented even in the case as supposed above.

In order to address the above problems, a mounting case of the present invention includes: a plate having a substrate and disposed to face one surface of an electro-optical device in which projection light from a light source is incident on an image display region, and a cover to cover the electro-optical device, a portion of the cover abutting against the plate, the mounting case accommodating the electro-optical device by holding at least a portion of a peripheral region positioned at the periphery of the image display region of the electro-optical device, wherein the plate has a coefficient of linear expansion within a predetermined range on the basis of the coefficient of linear expansion of the substrate.

According to the mounting case of an aspect of the present invention, it is possible to provide a mounting case suitable as the aforementioned mounting case constituting the electro-optical device encased in the mounting case of the present invention.

In order to address the above problems, a method to manufacture a mounting case of an aspect of the present invention which includes a plate disposed to face one surface of an electro-optical device in which projection light from a light source is incident on an image display region, and a cover to cover the electro-optical device, a portion of the cover abutting against the plate, the mounting case accommodating the electro-optical device by holding at least a portion of a peripheral region positioned at the periphery of the image display region of the electro-optical device, the method including: an annealing step to heat an original plate to be used as the plate to a predetermined temperature or more, and a pressing step of pressing the original plate after the annealing step.

According to the method to manufacture a mounting case of an aspect of the present invention, since a processing related to a mounting surface on which an electro-optical device is placed, and the provision of a three-dimensional shape allowing the electro-optical device to be properly installed in a housing constituting a projection display apparatus are performed, a press process is performed on the original plate to be used as the plate. Accordingly, first, according to an aspect of the present invention, the shape of the plate can be more precisely controlled in comparison to when the plate is formed by, for example, a sintering process. That is, measurement expedience may be easily performed, and the plate can be more cheaply formed.

Further, according to an aspect of the present invention, an annealing step is performed to heat the original plate to be used as the plate to a predetermined temperature or more prior to the press process. The annealing process enables the press process to be easily performed on materials which are relatively difficult to be subjected to the press process. Accordingly, the manufacturing cost can be reduced.

Moreover, the hard-handling materials typically include alloys including iron and nickel. Further, the "predetermined temperature" as referred to in the present invention typically corresponds to a so-called re-crystallization temperature, which may be different depending on materials.

In order to address the above problems, a projection display apparatus of an aspect of the present invention includes: the aforementioned electro-optical device encased in a mounting case of an aspect of the present invention (including various aspects thereof); the light source; an optical system to guide the projection light into the electro-optical device; and a projection optical system to project the light emitted from the electro-optical device.

According to the projection display apparatus of an aspect of the present invention, the difference between the coefficients of linear expansion of the plate and the substrate constituting the electro-optical device is limited to within a predetermined range. As a result, it is possible to suppress a situation in which irregular color occurs on an image generated by the action of a compressive force to the electro-optical device, which is concerned particularly in a low temperature environment, and it is also possible to suppress a situation in which dislocation of the electro-optical device occurs, which is concerned particularly in a high temperature environment.

The operations and other advantages of the present invention will be apparent from the exemplary embodiments described later.

BRIEF DESCRIPTION OF THE DRAWINGS

FIG. 1 is a plan view illustrating an exemplary embodiment of a projection liquid crystal apparatus according to the present invention;

FIG. 10 is a rear view as seen from the direction of Z2 shown in FIG. 9;

FIG. 11 is a side view as seen from the direction of Z3 shown in FIG. 9;

DETAILED DESCRIPTION OF EXEMPLARY EMBODIMENTS

Figure 2:
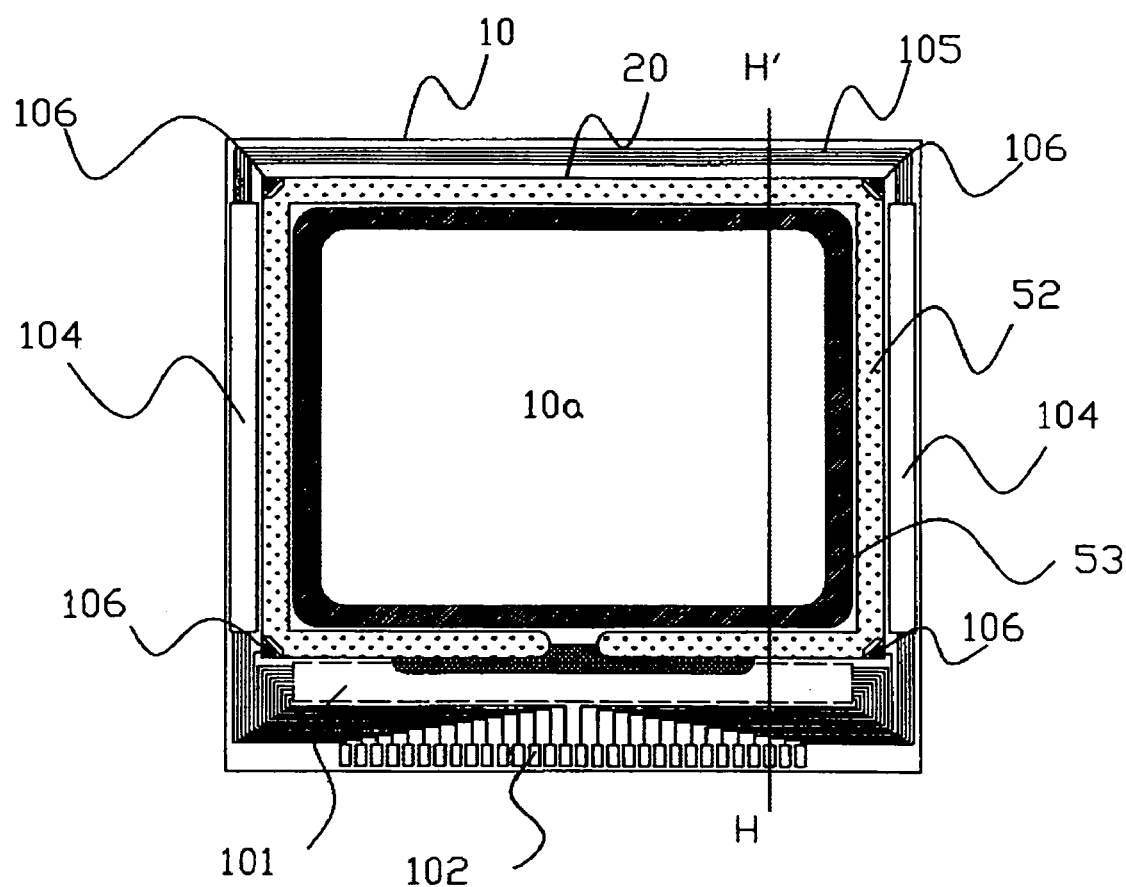
FIG. 2 is a plan view illustrating an exemplary embodiment of an electro-optical device according to the present invention.

Now, exemplary embodiments of the present invention will be described with reference to the accompanying figures.

An Exemplary Embodiment of a Projection Liquid Crystal Apparatus

First, with reference to FIG. 1, an exemplary embodiment of a projection liquid crystal apparatus according to the present invention will be described on the basis of an optical system which is assembled into an optical unit. The projection display apparatus of the exemplary embodiment is constructed as a multi-plate color projector including three liquid crystal light valves, each of which is an example of an electro-optical device encased in a mounting case.

In FIG. 1, a liquid crystal projector 1100, an example of the multi-plate color projector in the exemplary embodiment, is a projector which utilizes three liquid crystal light valves each having an electro-optical device in which a driving circuit is mounted on a TFT array substrate, as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B by three mirrors 1106 and two dichroic mirrors 1108, and the light components are guided into the light valves 100R, 100G, and 100B corresponding to the colors. In particular, the B light component is guided through a relay lens system 1121 including an incident lens 1122, a relay lens 1123, and an emitting lens 1124 in order to reduce or prevent the loss of light due to its long optical path. The light components corresponding to the three primary colors, which are modulated by the light valves 100R, 100G, and 100B, are again synthesized by a dichroic prism 1112 and then projected onto a screen 1120 as a color image through a projection lens 1114.

An active matrix driving liquid crystal device, in which TFTs are used as switching devices, is used as the light valves 100R, 100G, and 100B, as described later. The light valves 100R, 100G, and 100B are constructed as the electro-optical devices encased in the mounting cases as described later in detail.

As shown in FIG. 1, the liquid crystal projector 1100 is provided with a fan 1300 to send cooling air to the light valves 100R, 100G, and 100B. The fan 1300 includes a substantially cylindrical member having a plurality of blades 1301 at the side thereof, and the cylindrical member rotates about its axis to make the blades 1301 to generate wind. The wind generated by the fan 1300 in accordance with such a principle flows in whirls as shown in FIG. 1.

The wind is supplied to the respective light valves 100R, 100G, and 100B through an air passage not shown in FIG. 1, and is blown from respective outlets 100RW, 100GW, and 100BW provided near the light valves 100R, 100G, and 100B to the light valves 100R, 100G, and 100B.

If the fan 1300 as described above is used, it is possible to obtain an advantage that wind is easily supplied to narrow spaces around the light valves 100R, 100G, and 100B because the wind has a high static pressure.

In the aforementioned construction, the light emitted from the lamp unit 1102, which is an intensive light source, raises the temperatures of the light valves 100R, 100G, and 100B. In this case, even if the rise in temperatures alike in the light valves 100R, 100G, and 100B which receive the same light radiation (energy radiation), if the coefficient of linear expansion of the mounting case is different from that of the electro-optical device, the mounting case expands more largely than the electro-optical device. As a result, dislocation of the electro-optical device occurs. Additionally, when the liquid crystal projector 1100 is used in a low temperature atmosphere, the mounting case applies a compressive force to the electro-optical device, thereby generating irregular color on an image. Accordingly, in the exemplary embodiment, particularly, each light valve 100R, 100G, and 100B is configured such that a plate constituting the mounting case has a smaller coefficient of linear expansion than that of a substrate constituting the electro-optical device, as described later.

In the exemplary embodiment, it is preferable that a cooling device, etc., including a circulating unit to circulate a coolant through the surrounding spaces of the light valves 100R, 100G, and 100B is provided within a housing of the liquid crystal projector 1100. This makes it possible to further efficiently cool the electro-optical device encased in the mounting case having a heat radiating function as described later.

An Exemplary Embodiment of an Electro-Optical Device

Figure 3:
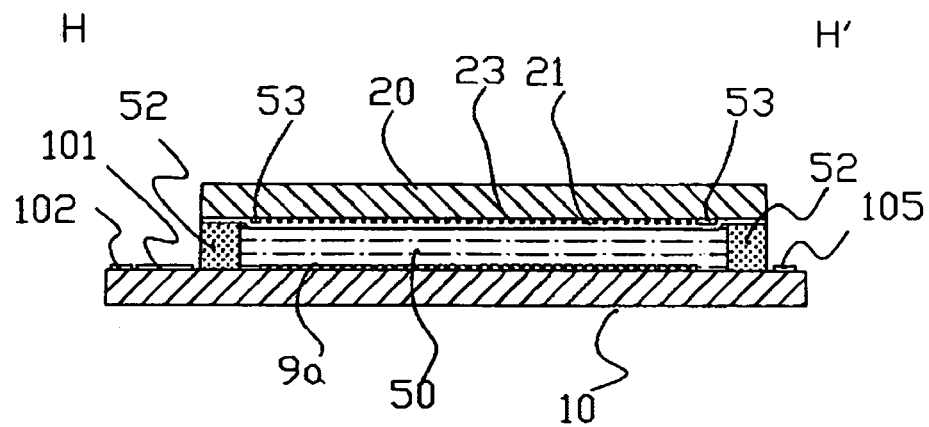
FIG. 3 is a cross-sectional view taken along the plane H–H' shown in FIG. 2.

Next, the overall construction of an electro-optical device according to an exemplary embodiment of the present invention will be described with reference to FIGS. 2 and 3. Herein, a driving circuit built-in TFT active driving liquid crystal device is illustrated as an example of an electro-optical device. The electro-optical device according to the exemplary embodiment is used as the liquid light valves 100R, 100G, and 100B of the aforementioned liquid crystal projector 100. Herein, FIG. 2 is a plan view of the electro-optical device and illustrates a TFT array substrate and constructional components provided thereon as seen from the counter substrate. FIG. 3 is a cross-sectional view taken along the plane H–H' shown in FIG. 2.

Referring to FIGS. 2 and 3, in the electro-optical device according to the exemplary embodiment, the TFT array substrate 10 is disposed to face the counter substrate 20. A liquid crystal layer 50 is interposed and sealed between the TFT array substrate 10 and the counter substrate 20. The TFT array substrate 10 and the counter substrate 20 are bonded to each other by a sealing member 52 disposed in a sealed region which is positioned around an image display region 10a.

The sealing member 52 to bond the substrates is made of, for example, ultraviolet curable resin, thermosetting resin, or the like, which is applied on the TFT array substrate 10 and then cured by ultraviolet radiation or heating in manufacturing processes. In addition, spacers made of a material, such as glass fiber or glass bead are dispersed in the sealing member 52 to keep the gap between the TFT array substrate 10 and the counter substrate 20 (the gap between the substrates) at a predetermined distance. That is, the electro-optical device of the exemplary embodiment is small in size and is suitably used as a light valve of a projector to enlarge and display images.

A frame light-shielding film 53 having a light-shielding property and defining a frame region of the image display region 10a is provided at the counter substrate 20 side parallel to the inner side of the sealed region where the sealing member 52 is disposed. All or a portion of the frame light-shielding film 53 may be provided at the TFT array substrate 10 side as a built-in light-shielding film.

In the peripheral region positioned at the outer side of the sealed region, where the sealing member 52 is disposed, of a region extending to the circumference of the image display region, a data line driving circuit 101 and an external circuit connection terminal 102 are provided along one side of the TFT array substrate 10. Scanning line driving circuits 104 are provided along two sides adjacent to the one side. Furthermore, a plurality of wiring lines 105 to connect the scanning line driving circuits 104 provided along the two sides of the image display region 10a are provided at the remaining side of the TFT array substrate 10. As shown in FIG. 2, upper and lower conducting members 106 serving as upper and lower conduction terminals between the two substrates are disposed at four corners of the counter substrate 20. On the other hand, on the TFT array substrate 10, upper and lower conduction terminals are provided at the regions opposite to the corners. Through these members, the electrical conduction is made between the TFT array substrate 10 and the counter substrate 20.

In FIG. 3, TFTs for pixel switching and wiring lines, such as scanning lines and data lines are formed on the TFT array substrate 10, and then, alignment layers are formed on pixel electrode 9a. On the other hand, on the counter substrate 20, a counter electrode 21 and a light shielding film 23 are provided in a lattice or stripe shape, and in addition, an alignment layer is formed on the uppermost portion thereof. A liquid crystal layer 50, which is made of, for example, one kind of nematic liquid crystal or a mixture of plural kinds of nematic liquid crystal, takes a predetermined alignment state between a pair of the alignment layers.

In addition to the data line driving circuit 101 and the scanning line driving circuits 104, etc., a sampling circuit to sample image signals on image signal lines and to supply the sampled image signals to data lines, a precharge circuit to supply the precharge signals of a predetermined level to a plurality of data lines prior to the image signals, a test circuit to test the quality and defects of the electro-optical device during the manufacturing process or at the time of forwarding, and the like may be formed on the TFT array substrate 10 shown in FIGS. 2 and 3.

When the electro-optical device as constructed above is operated, intensive light is radiated from the upper side of FIG. 3. As a result, the temperature of the electro-optical device rises by the heating due to the light absorption in the counter substrate 20, the liquid crystal layer 50, and the TFT array substrate 10, etc. As already described, the same phenomenon occurs also in the mounting case to receive the corresponding electro-optical device. The rise in temperature of the electro-optical device, particularly, the counter substrates 20 or the TFT array substrate 10, and the mounting case, particularly, the plate which will be described later, may cause different expansion due to the difference between the coefficient of linear expansion thereof, and may also cause dislocation of the electro-optical device in the mounting case. In addition, a cooling process of the mounting case and the electro-optical device whose temperatures have risen applies a compressive force to the electro-optical device by the mounting case. As a result, the quality of a display image may deteriorate.

Accordingly, particularly in the exemplary embodiment, the above-described problems are efficiently suppressed as described later.

An Electro-Optical Device Encased in a Mounting Case

Next, an electro-optical device encased in a mounting case according to an exemplary embodiment of the present invention will be described with reference to FIGS. 4 to 13.

Figure 4:
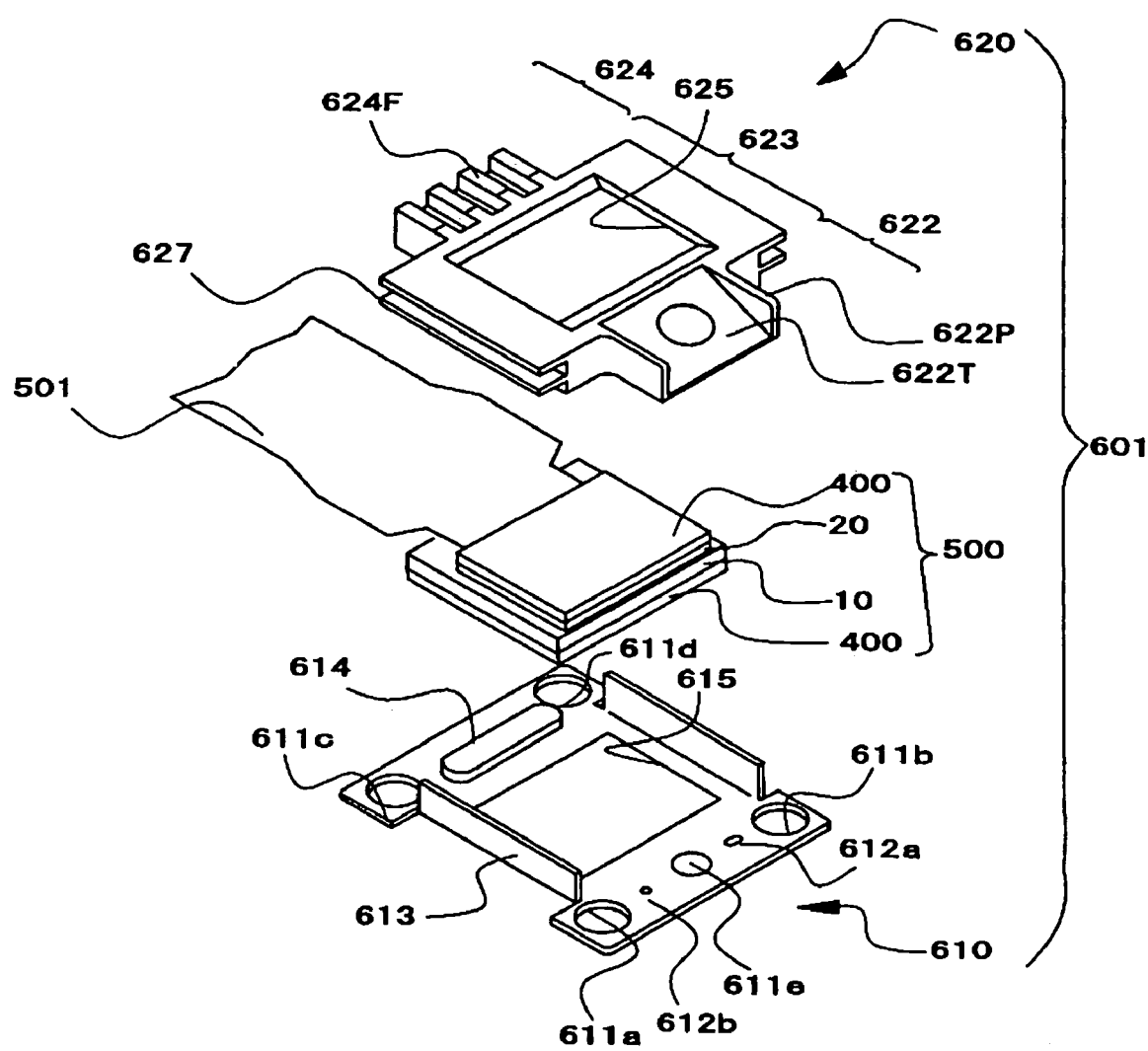
FIG. 4 is an exploded perspective view illustrating an electro-optical device together with a mounting case according to an exemplary embodiment of the present invention.
Figure 5:
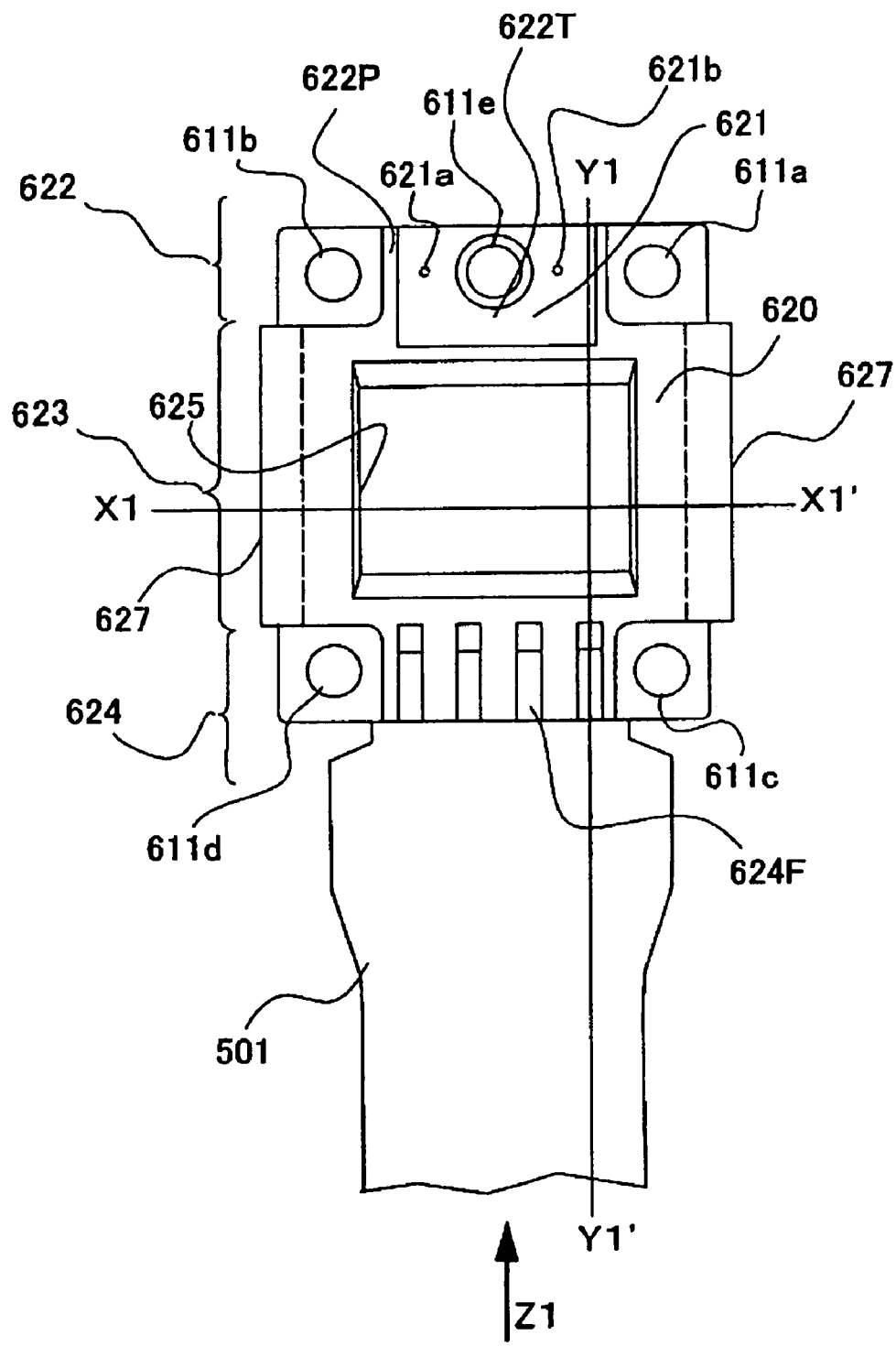
FIG. 5 is a front view of an electro-optical device encased in the mounting case according to an exemplary embodiment of the present invention.
Figure 6:
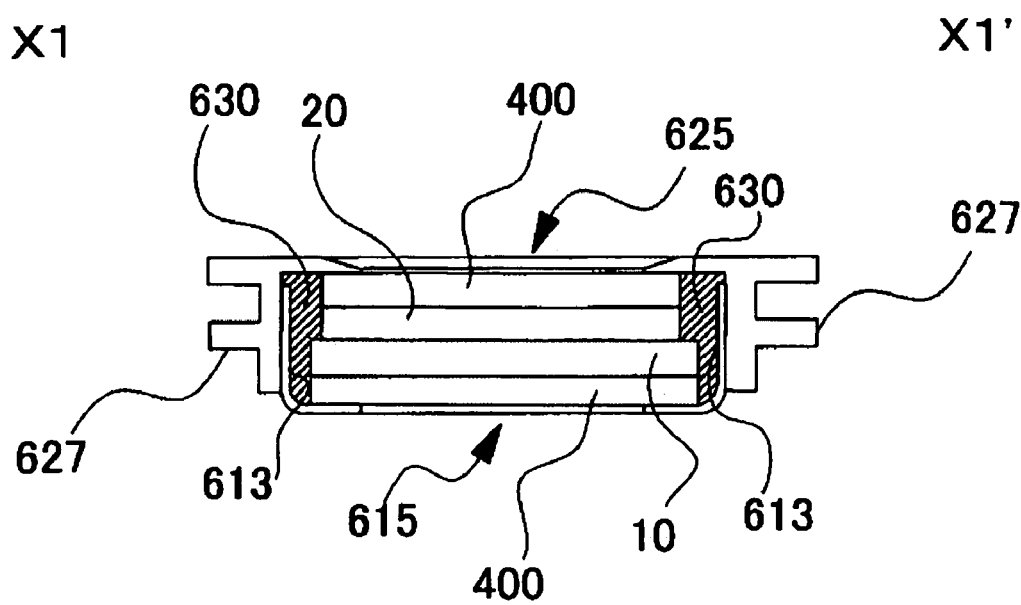
FIG. 6 is a cross-sectional view taken along the plane X1–X1' shown in FIG. 5.
Figure 7:
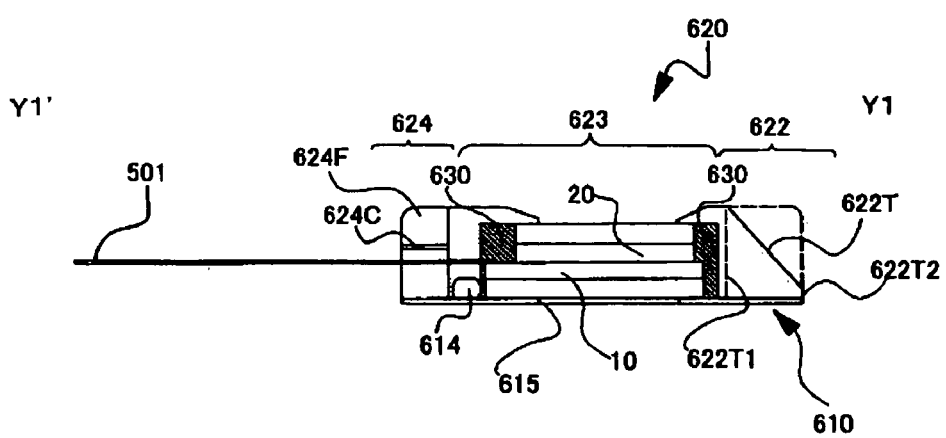
FIG. 7 is a cross-sectional view taken along the plane Y1–Y1' shown in FIG. 5.
Figure 8:
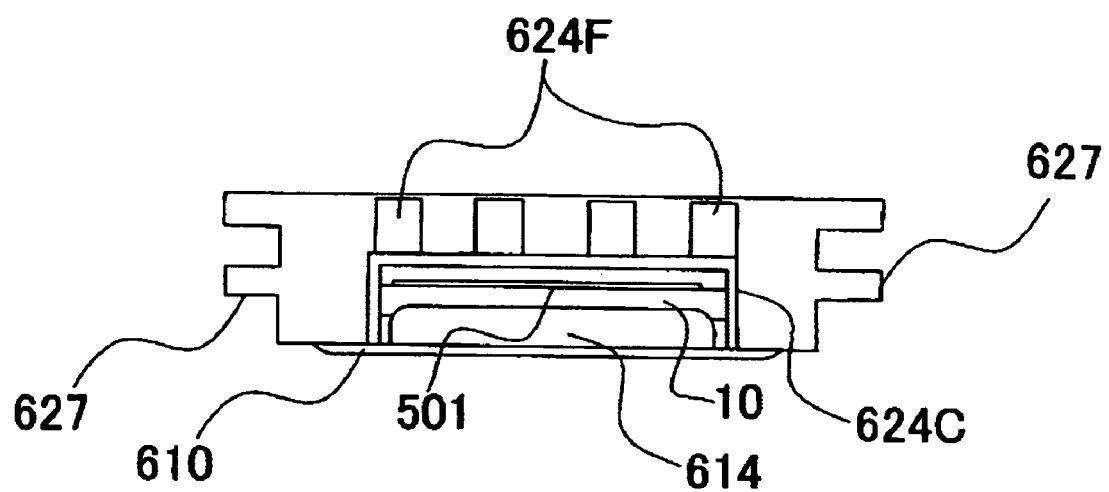
FIG. 8 is a rear view as seen from the direction of Z1 shown in FIG. 5.
Figure 9:
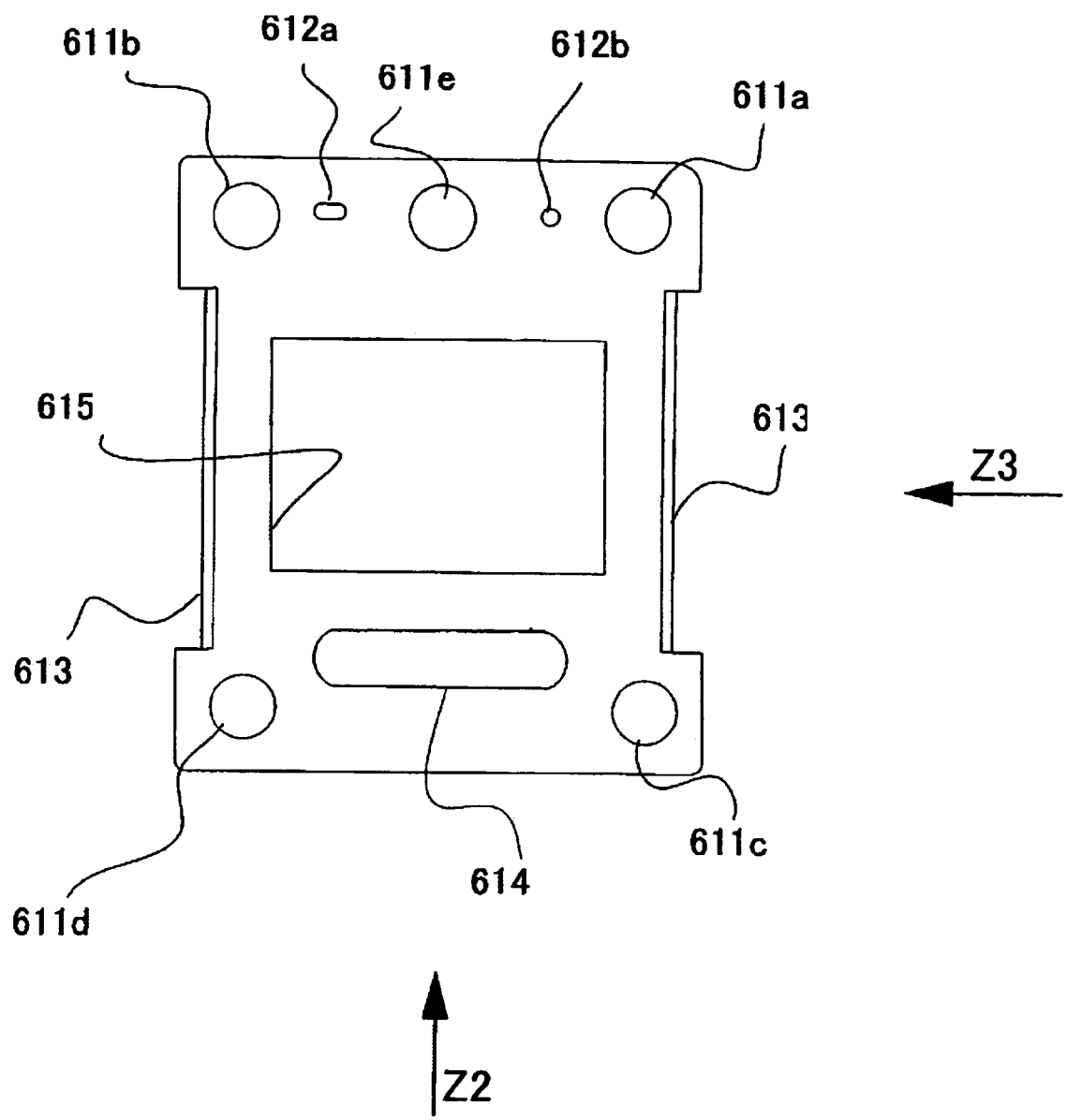
FIG. 9 is a front view of a plate member constituting the mounting case according to an exemplary embodiment of the present invention.

First, the basic construction of a mounting case according to the exemplary embodiment will be described with reference to FIGS. 4 to 11. Herein, FIG. 4 is an exploded perspective view illustrating an electro-optical device together with a mounting case according to the exemplary embodiment, FIG. 5 is a front view of the electro-optical device encased in the mounting case, FIG. 6 is a cross-sectional view taken along the plane X1–X1' shown in FIG. 5. FIG. 7 is a cross-sectional view taken along the plane Y1–Y1' shown in FIG. 5. FIG. 8 is a back view seen from the direction of Z1 shown in FIG. 5. In addition, FIG. 9 is a front view of a plate member constituting the mounting case. FIG. 10 is a back view seen from the direction of Z2 shown in FIG. 9. FIG. 11 is a side view seen from the direction of Z3 shown in FIG. 9. FIGS. 4 to 8 illustrate the mounting case in which the electro-optical device is accommodated.

As shown in FIGS. 4 to 8, the mounting case 601 includes a plate member 610 and a cover member 620. An electro-optical device 500, which is accommodated in the mounting case 601, includes the electro-optical devices shown in FIGS. 2 and 3, and other optical components, such as a reflection preventing plate overlapped on the surface thereof, and an external circuit connecting terminal, to which a flexible connector 501 is connected. Furthermore, a polarizing plate or a phase difference plate may be provided in the optical system of the liquid crystal projector 1100, or it may be overlapped on the surface of the electro-optical device 500.

Moreover, a dustproof substrate 400 is provided on the TFT array substrate 10 and the counter substrate 20 on the surfaces not facing the liquid crystal layer 50 (see FIGS. 4 and 6). The dustproof substrate 400 is constructed to have a predetermined thickness. The dustproof substrate reduces or prevents dirt or dust drifting around the electro-optical device 500 from being directly attached on the surface of the electro-optical device. Therefore, it is possible to effectively remove a defect that a figure of dirt or dust appears on the magnified projection image. This is because the dustproof substrate 400 has the predetermined thickness, so that the dustproof substrate has a defocusing function to deviate the focus of the source light or the vicinity thereof from a location where dirt or dust exists, that is, from the surface of the dustproof substrate 400.

As shown in FIG. 4, the electro-optical device 500 including the TFT array substrate 10, the counter substrate 20, and the dustproof substrate 400 as described above is accommodated in the mounting case 601 including the plate member 610 and the cover member 620. However, as shown in FIGS. 6 and 7, a molding member 630 is filled between the electro-optical device 500 and the mounting case 601. The molding member 630 ensures the bonding between the electro-optical device 500 and the mounting case 601 and surely reduces or prevents the occurrence of dislocation of the former within the latter.

In the exemplary embodiment, it is assumed that the light is incident on the cover member 620, passes through the electro-optical device 500, and exits from the plate member 610. That is, referring to FIG. 1, the component facing the dichroic prism 1112 is not the cover member 620 but the plate member 610.

Now, the construction of the plate member 610 and the cover member 620 constituting the mounting case 601 will be described in more detail.

First, as shown in FIGS. 4 to 11, the plate member 610 is a member having a substantially quadrilateral shape in plan view and is disposed to face one surface of the electro-optical device 500. In the exemplary embodiment, the plate member 610 and the electro-optical device 500 are directly abutted against each other, and the latter appears to be mounted on the former.

More specifically, the plate member 610 includes a window 615, a bent portion 613, a strength reinforcement portion 614, a cover member fixing hole 612, and attaching holes 611a to 611d and 611e.

The window 615 is formed by opening a portion of the member having the substantially quadrilateral shape. For example, the window 615 is a member to enable light to transmit from the upper side to the lower side in FIG. 6. The light passed through the electro-optical device 500 can exit from the window 615. Accordingly, when the electro-optical device 500 is mounted on the plate member 610, the peripheral region located at the periphery of the image display region 10a of the electro-optical device 500 is in an abutting state against the edge of the window 615. In this manner, the plate member 610 realizes the holding of the electro-optical device 500.

The bent portion 613 is a portion formed by bending a portion of each of two opposite sides of the member having the substantially quadrilateral shape toward the inside of the quadrilateral shape. The outer surface of the bent portion 613 is abutted against the inner surface of the cover member 620 when the plate member 610 and the cover member 620 are assembled (see FIG. 6). The inner surface of the bent portion 613 is abutted against the outer surface of the electro-optical device 500 through the molding member 630 (see FIG. 6). As a result, the location of the electro-optical device 500 on the plate member 610 is roughly determined.

In addition, since the inner surface of the bent portion 613 abuts against the outer surface of the electro-optical device 500 through the molding member 630, the absorption of heat from the former to the latter is available. In other words, the plate member 610 can function as a heat sink for the electro-optical device 500. Thus, it is possible to reduce or prevent the accumulation of heat in the electro-optical device 500 due to the intensive light radiation from the lamp unit 1102 to the electro-optical device 500. In addition, since the outer surface of the bent portion 613 abuts against the inner surface of the cover member 620 as described above, the heat transfer from the former to the latter is available. The heat radiation from the electro-optical device 500 is performed, in principle, by the amount corresponding to heat capacitances of both of the plate member 610 and the cover member 620, so that the cooling of the electro-optical device 500 can be very effectively performed.

The strength reinforcement portion 614 has a three-dimensional shape and is formed by a process of convexing a portion of the member having the substantially quadrilateral shape higher than other portions in plan view. As a result, the strength of the plate member 610 is reinforced. The strength reinforcement portion 614 may be disposed at a location substantially abut against one side of the electro-optical device 500 (see FIG. 7). However, strictly speaking, both of them do not abut against each other in FIG. 7. According to this, in addition to the bent portion 613, the position of the electro-optical device 500 on the plate member 610 is also somewhat determined by the strength reinforcement portion 614.

The cover member fixing hole 612 is a hole engaged with a convex portion 621 provided at the corresponding location in the cover member 620. The plate member 610 and the cover member 620 are fixed to each other by the engagement of the cover member fixing hole portion 612 with the convex portion 621. In addition, in the exemplary embodiment, the cover member fixing hole 612 includes two holes as shown in each figure. In case of the need of distinguishing the holes, the two holes are referred to as cover member fixing holes 612a and 612b, respectively. Corresponding to the holes, the convex portion 621 includes two convex portions. In case of the need of distinguishing the convex portions, the two convex portions are referred to as convex portions 621a and 621b, respectively.

Finally, the attaching holes 611a to 611d are used to attach the electro-optical device encased in the mounting case within the liquid crystal projector 1100 as shown in FIG. 1. In the exemplary embodiment, the attaching holes 611a to 611d are provided at four corners of the member having the substantially quadrilateral shape. In addition to the attaching holes 611a to 611d, an attaching hole 611e is provided in the exemplary embodiment. The attaching hole 611e is disposed to form a triangle together with the attaching holes 611c and 611d of the attaching holes 611a to 611d. In other words, the attaching holes 611e, 611c, and 611d are disposed as the corresponding apexes of the triangle.

As a result, in the exemplary embodiment, it is possible to fix the four points at the four corners using the attaching holes 611a to 611d and to fix the three points at the three corners using the attaching holes 611e, 611c, and 611d.

In the exemplary embodiment of the present invention, especially, a plate member 610 has the following features. In the plate member 610 according to the exemplary embodiment of the present invention, the light emitting surface thereof is black. Here, the "light emitting surface" corresponds to the surface indicated by reference numeral 610F in FIG. 10 or FIG. 11. Incidentally, in FIG. 9, it corresponds to the rear surface, not shown, of the paper. This is because in the exemplary embodiment, light is assumed to enter from the cover member 620 side, pass through the electro-optical device 500, and exits from the plate member 610 side, as already described.

As described above, the surface color of the light emitting surface of the plate member 610 is black and thus the light passed through a window 615 of the plate member 610 is related to a returning light reflected by any element of a liquid crystal projector 1100 or one among light valves 100R, 100G, and 100B, as shown in FIG. 1. Also, the incidence light and the like emitted from the other two light valves to the remaining light valve is reflected at the light emitting surface 610F of the plate member 610, which reduces or prevents the useless reflected light from being mixed into the projected image beforehand. Accordingly, in the present invention, a high quality image can be displayed without deterioration of image quality.

Incidentally, in order to make the light emitting surface 610F black, painting the surface with, for example, black coating material or electroplating the surface with a proper metal, such as nickel and the like, or other means and construction can be employed.

Although FIG. 10 or FIG. 11 shows an exemplary embodiment where only the surface 610F is painted in black, the present invention is not limited to such an embodiment. For example, a surface opposite to the pertinent surface 610F, that is, the surface shown in FIG. 9, may be colored in black.

Additionally, the plate member 610 according to the exemplary embodiment of the present invention has characteristics in that it is made of a specific material and is also formed by a press working after annealing. However, these characteristics will be described later.

Secondly, the cover member 620, as shown in FIGS. 4 to 11, is a member having a substantially cubic shape, and is arranged to face the surface opposite to the surface facing the plate member 610 in the electro-optical device.

The cover member 620 is preferably made of light shielding resin, metallic material, or the like in order to reduce or prevent the leakage of the light in the peripheral region of the electro-optical device 500 and the entry of the stray light from the peripheral region to the image display region 10a. Since it is preferable that the cover member 620 functions as a heat sink for the plate member 610 or the electro-optical device 500, the cover member 620 is preferably made of a material of relatively high heat conductivity, such as aluminum, magnesium, copper, or an alloy thereof.

More specifically, the cover member 620 includes the convex portion 621, a cover main body 623, a cooling air introducing portion 622, and a cooling air discharging portion 624. The convex portion 621 is used for fixing to the plate member 610, as already described, and includes two convex portions 621a and 621b at the locations corresponding to the cover member fixing holes 612a and 612b. As shown in FIG. 5, the convex portion 621 according to the exemplary embodiment is provided to form a portion of the cooling air introducing portion 622 or a tapered portion 622T as described later. Although the convex portion 621 is not originally seen from the view point of FIG. 5, it is particularly shown in FIG. 5.

The cover main body 623, as shown in FIGS. 4 to 7, is a substantially rectangular parallelepiped member and located as if inserted between a cooling air introducing portion 622 and a cooling air discharging portion 624, which will be described later. Herein, the inside of the rectangular parallelepiped shape is in the so-called hollow state so as to accommodate the electro-optical device 500 therein. Strictly speaking, the cover main body 623 is a member having a shape of a box without its cover. The "cover" in this expression may be considered to correspond to the plate member 610 described above.

More specifically, the cover main body 623 has the window 625 and a side fin portion 627. The window 625 is an opening formed on the bottom of the box shape, or in FIG. 4 or 6, on the top surface to allow light to pass from the upper part to the lower part in FIG. 6. The light emitted from the lamp unit 1102 within the liquid crystal projector 1100 shown in FIG. 1 can be incident to the electro-optical device 500 through the window 625. In addition, in the cover main body 623 having the window 625, the peripheral region near the image display region 10a of the electro-optical device 500 may be preferably formed to abut against the edge of the window 625 similar to the description of the window 615 in the plate member 610. By doing so, the cover main body 623, more particularly, the edge of the window 625 can also realize the holding of the electro-optical device 500.

On the other hand, the side fin portion 627 is formed on both sides of the cover main body 623. Here, the "both sides" indicate the sides where the cooling air introducing portion 622 and the cooling air discharging portion 624, which will be described later, do not exist. More specifically, the side fin portion 627, as shown in FIG. 4 or FIG. 6, includes a plurality of straight portions protruding in parallel from the above-mentioned sides and extending towards the cooling air discharging portion 624 from the cooling air introducing portion 622 (in FIG. 4, etc., two straight portions protrude in parallel from each side). As a result, the surface area of the cover main body 623 or the cover member 620 increases.

Moreover, as already described, the inner surface of the cover member 620 abuts against the outer surface of the bent portion 613 of the plate member 610 in assembling the cover member 620 and the plate member 610 together (see FIG. 6). In this case, the inner surface of the cover member 620' corresponds to the inner surface of the cover main body 623.

The cooling air introducing portion 622, as well shown in FIG. 4 or FIG. 7, includes a tapered portion 622T and a baffle plate 622P. In the exemplary embodiment, the tapered portion 622T has an appearance of a substantially triangular prism with its bottom being a right triangle. In addition, the tapered portion 622T has an appearance such that one side of the triangular prism of the tapered portion 622T is attached to one side of the cover main body 623. In this case, the one side of the triangular prism includes the side interposed between a rectangular portion of the bottom of the triangular prism and a corner portion adjacent thereto. Therefore, the tapered portion 622T has a base portion 622T1, the highest side of the sides of the cover main body 623, and a tip 622T2 so that it gradually lowers its height from the base portion 622T1 to the tip 622T2. However, the term "height" here is a distance in the longitudinal direction in FIG. 7. In FIG. 7, a broken line extending in the longitudinal direction is illustrated as a reference. On the other hand, the baffle plate 622P has an appearance of a wall erected along one side between two angles except for the rectangular portion on the bottom of the triangular prism. Explaining in terms of the aforementioned "height", the height of the baffle plate 622P is constant at any place between the base portion 622T1 and the tip 622T2 although the height of the tapered portion 622T is gradually lowered from the base portion 622T1 to the tip 622T2.

Finally, the cooling air discharging portion 624 includes a flexible connector leading portion 624C and a rear fin portion 624F, as shown in FIGS. 4, 5 or 8. The flexible connector leading portion 624C is provided on one side of the cooling air discharging portion 624 facing the side of the cover main body 623 on which the tapered portion 622T is provided. More specifically, it appears that a member having a U-shaped cross section is attached on the aforementioned side with the opening portion directed downward in FIG. 8 as shown in FIG. 8. A flexible connector 501 connected to the electro-optical device 500 is drawn out from the U-shaped space.

On the other hand, the rear fin portion 624F is provided on the so-called ceiling plate of the U-shaped cross section of the flexible connector leading portion 624C. More specifically, the rear fin portion 624F has a shape that a plurality (four in FIG. 4, etc.) of portions straightly protruding in parallel from the ceiling plate to correspond to the direction of the previously-described straightly protruding portions, that is, the side fin portions 627, as shown in FIGS. 4, 5, or 8. By doing so, the surface area of the cover member 620 increases.

Figure 12:
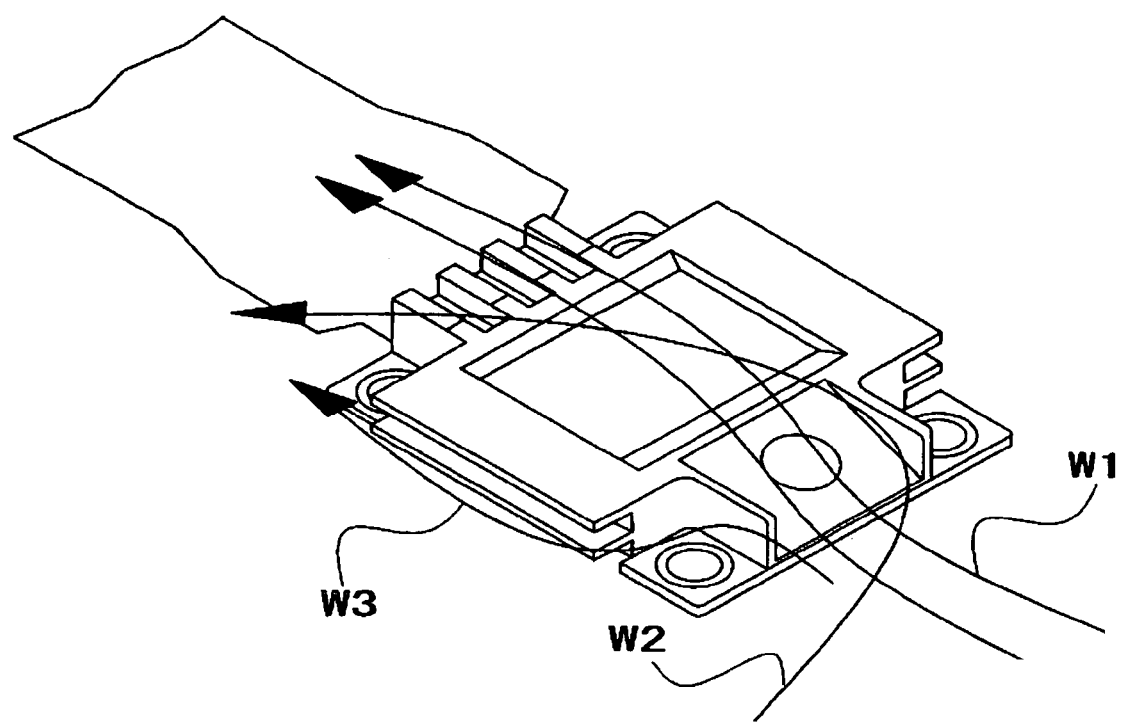
FIG. 12 is a perspective view of the electro-optical device encased in the mounting case according to an exemplary embodiment of the present invention and illustrates the flow of air into the electro-optical device encased in the mounting case.

Since the cover member 620 has the aforementioned construction, the wind blown from the fan 1300 provided in the liquid crystal projector 1100 as shown in FIG. 1 flows in the mounting case 601 or in the vicinity of the cover member 620 as shown in FIG. 12. Here, FIG. 12 is a perspective view of an electro-optical device encased in the mounting case and illustrates a typical flow of a wind into the electro-optical device encased in the mounting case. It is noted that in order to implement the same flow of the cooling air in the liquid crystal projector 1100 shown in FIG. 1 as that of FIG. 12, it is necessary to arrange the electro-optical device encased in the mounting case, that is, the light valves 100R, 100G, and 100B such that the outlets 100RW, 100GW, and 100BW described above with reference to FIG. 1 can face the cooling air introducing portion 622 constituting the cover member 620.

First, as if the cooling air runs up the tapered portion 622T of the cooling air introducing portion 622, the cooling air is blown to the cover main body 623 where the surface of the electro-optical device 500 is exposed (see reference numeral W1). In addition, since the baffle plate 622P is provided in the cooling air introducing portion 622, the cooling air blown from any direction can be almost guided on the tapered portion 622T, and thus, into the cover main body 623 (see reference numeral W2). In this way, according to the exemplary embodiment, since the wind can be effectively blown out toward the cover main body 623, the heat generated from the electro-optical device 500 can be directly removed. In other words, in addition to the cooling function, the heat accumulated in the cover member 620 can be effectively removed.

The wind which is blown toward the outer side of the baffle plate 622P of the cooling air introducing portion 622, that is, the side not facing the tapered portion 622T, or the wind which reaches the surface of the electro-optical device 500 or the vicinity thereof as described above and then flows along the side of the cover main body 623, reaches the side fin portion 627(see reference numeral W3). As described above, since the side fin portion 627 has the protruding straight fins and the surface area of the cover main body 623 is increased, it is possible to effectively cool the cover main body 623 or the cover member 620. In addition, as described above, the wind which reaches the surface of the electro-optical device 500 or the vicinity thereof and then, as it is, flows toward the end portion of the cover main body 623 reaches the rear fin portion 624F (see reference numeral W1). Since the rear fin portion 624F has the straight protrusion portion and the surface area of the cooling air discharging portion 624 is increased as described above, it is possible to effectively cool the cooling air discharging portion 624 or the cover member 620.

As described above, in the mounting case 601 according to the exemplary embodiment, it is possible to effectively perform the cooling by the cooling wind, as a whole. In addition, such a cooling method is very efficient in externally radiating the heat transferred from the electro-optical device 500, the plate member 610, and the cover member 620 in this order as described above. That the cover member 620 can be effectively cooled means that the flow of heat transferred from electro-optical device 500 through the bent portion 613 to plate member 610 or the cover member 620 can be effectively maintained at any time. In other words, since the cover member 620 is suitably cooled in a normal state, its function as a heat sink can be maintained at any time, and thus, the heat radiation from the plate member 610 with respect to the cover member 620, and moreover, from the electro-optical device 500 can be effectively performed.

Therefore, since heat is not excessively accumulated in the electro-optical device 500 according to the exemplary embodiment, the deterioration of the liquid crystal layers 50 or the occurrence of the hot spots can be reduced or prevented, so that the deterioration of images can be greatly reduced.

However, it is not enough to fully address the problems only through this. As mentioned in the related art, wherein at the rise in the temperature of an electro-optical device encased in the electro-optical device 500, the dislocation of the electro-optical device in a mounting case occurs or at the fall of the temperature of the electro-optical device encased in the electro-optical device, compressive force is applied to the electro-optical device by the mounting case. Accordingly, particularly in the exemplary embodiment, the plate member 610 has the following construction. That is, the plate member 610 according to the exemplary embodiment is made of a material, which has a coefficient of linear expansion of a predetermined range, i.e., preferably, within $\pm 5 \times 10^{-6}$[/° C.], more preferably, $\pm 2.5 \times 10^{-6}$[/° C.], on the basis of the coefficient of linear expansion of the counter substrate 20 or the TFT array substrate 10 constituting the electro-optical device.

More specifically, in the exemplary embodiment, the counter substrate 20 and the TFT array substrate 10, and the aforementioned dustproof substrates 400 (hereinafter, referred to the TFT array substrate 10 and the like) are made of, for example, quartz glass while the plate member 610 is made of, for example, a so-called invar alloy, such as 36Ni—Fe alloy. Thus, the coefficient of linear expansion of the former becomes about $0.48 \times 10^{-6}$[/° C.] and the coefficient of linear expansion of the latter becomes about $1.2 \times 10^{-6}$[/° C.]. Accordingly, the coefficient of linear expansion of the latter is larger than that of the former only by about $0.72 \times 10^{-6}$[/° C.], which fully satisfies even the most rigid condition as described above.

According to the above construction, since the TFT array substrate 10 and the like and the plate member 610 have nearly the same coefficient of linear expansion, both units are similarly expanded or contracted as far as they are under the thermally identical environment. Thus, firstly, it is possible to reduce or prevent such a situation as predicted to occur when the coefficient of linear expansion of the plate member 610 is larger than that of the TFT array substrate 10 and the like or the ambient temperature is low, namely the situation that the highly contracted plate member 610 compresses the electro-optical device 500. Secondly, even when the ambient temperature is high, the situation that the installation place of the electro-optical device 500 is dislocated can be also avoided.

Accordingly, in the present invention, the situation that irregular color is generated on an image due to the compressive force to the electro-optical device 500, which is especially worrisome in the low temperature environment, can be reduced or prevented, and also the situation that the dislocation of the electro-optical device 500 is generated, which is especially worrisome in the high temperature environment, can also be reduced or prevented.

Figure 13:
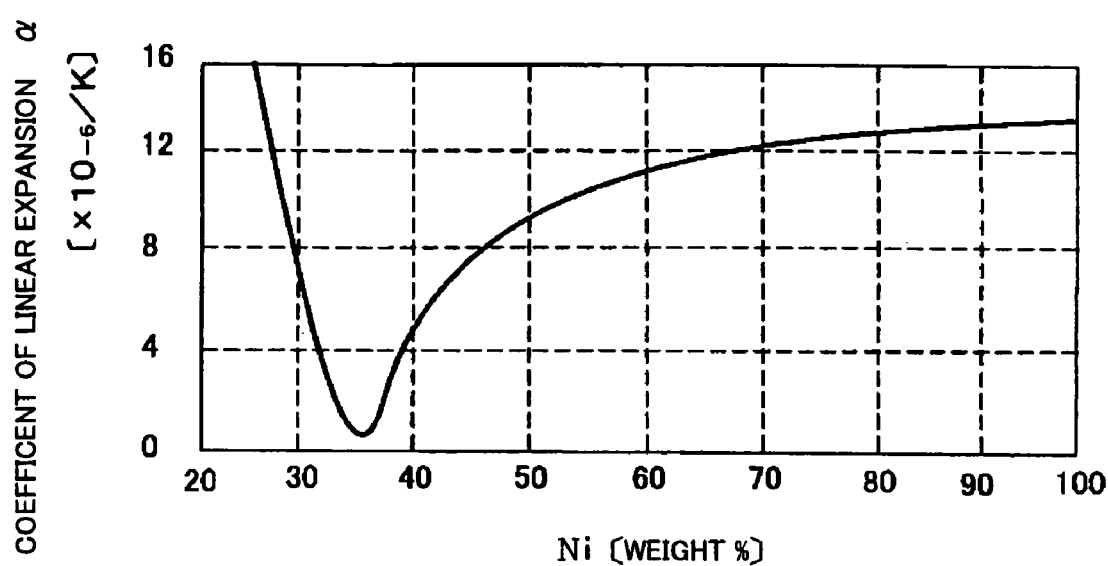
FIG. 13 is a graph showing how the coefficient of linear expansion of a corresponding alloy changes depending on the amount of nickel to iron.

Although in the above exemplary embodiment, 36Ni—Fe alloy is used as a material constituting the plate member 610, the present invention is not limited to this. For example, first, with respect to alloys containing only iron and nickel, which can be suitably used for the plate member 610, the composition ratio is not limited to the above-described ratio. Specifically, by using a graph illustrated in FIG. 13, for example, it is possible to determine what composition ratio of alloy to use. FIG. 13 is a graph illustrating how the coefficient of linear expansion of an alloy changes corresponding to the change of nickel content to iron. As seen from FIG. 13, 36Ni—Fe alloy has the lowest coefficient of linear expansion and is an optimum material to construct the plate member 610. However, other than 36Ni—Fe alloy, most alloys having about 36 percent by weight of Ni have relatively low coefficients of linear expansion. Thus it is clear that there exists an alloy which satisfies the above condition of $\pm 5 \times 10^{-6}[/^\circ C.]$ or $\pm 2.5 \times 10^{-6}[/^\circ C.]$ among such alloys. Accordingly, in an aspect of the present invention, such nickel and iron alloys having the above composition ratio can be preferably used similar to the 36Ni—Fe alloy.

Further, as an alloy containing iron and nickel satisfying the above condition, there is a so-called COVAR alloy. Specific examples of the COVAR alloy include 32Ni-5Co—Fe alloy, 29Ni-17Co—Fe alloy and the like. With respect to the coefficients of linear expansion of these alloys, the former is about $0.1 \times 10^{-6}[/^\circ C.]$ and the latter is about $5.0 \times 10^{-6}[/^\circ C.]$. Accordingly, these materials can be said to be very useful for the present invention.

Also, the present invention is not restricted to an alloy containing iron and nickel. For example, additionally, there is a copper and tungsten alloy (Cu—W alloy) or a ceramics material including alumina ($Al_2O_3$) and silica ($SiO_2$), although it is not metal, as an alloy which satisfies the above condition of $\pm 5 \times 10^{-6}[/^\circ C.]$ or $\pm 2.5 \times 10^{-6}[/^\circ C.]$. In an aspect of the present invention, these materials can be used as a material constructing the plate member 610.

Method to Manufacture a Plate Member

Hereinafter, a method to manufacture a mounting case according to an aspect of the present invention, especially, a method to manufacture the plate member 610 which characterizes an aspect of the present invention, will be described with reference to FIG. 14. Here, FIG. 14 is a flow chart illustrating a part of processes to manufacture the plate member 610 according to an exemplary embodiment of the present invention.

The plate member 610 according to an exemplary embodiment of the present invention can be made of an alloy containing iron and nickel as described above. However, it is not relatively easy to process such alloy. For example, although it is possible to form the plate member 610 illustrated in FIGS. 9 to 11 through a sintering process or the like, it is generally difficult to form the plate member according to designed dimensions, i.e., desired measurement. Also, in general, a problem occurs such as the cost of the sintering method being very expensive.

Figure 14:
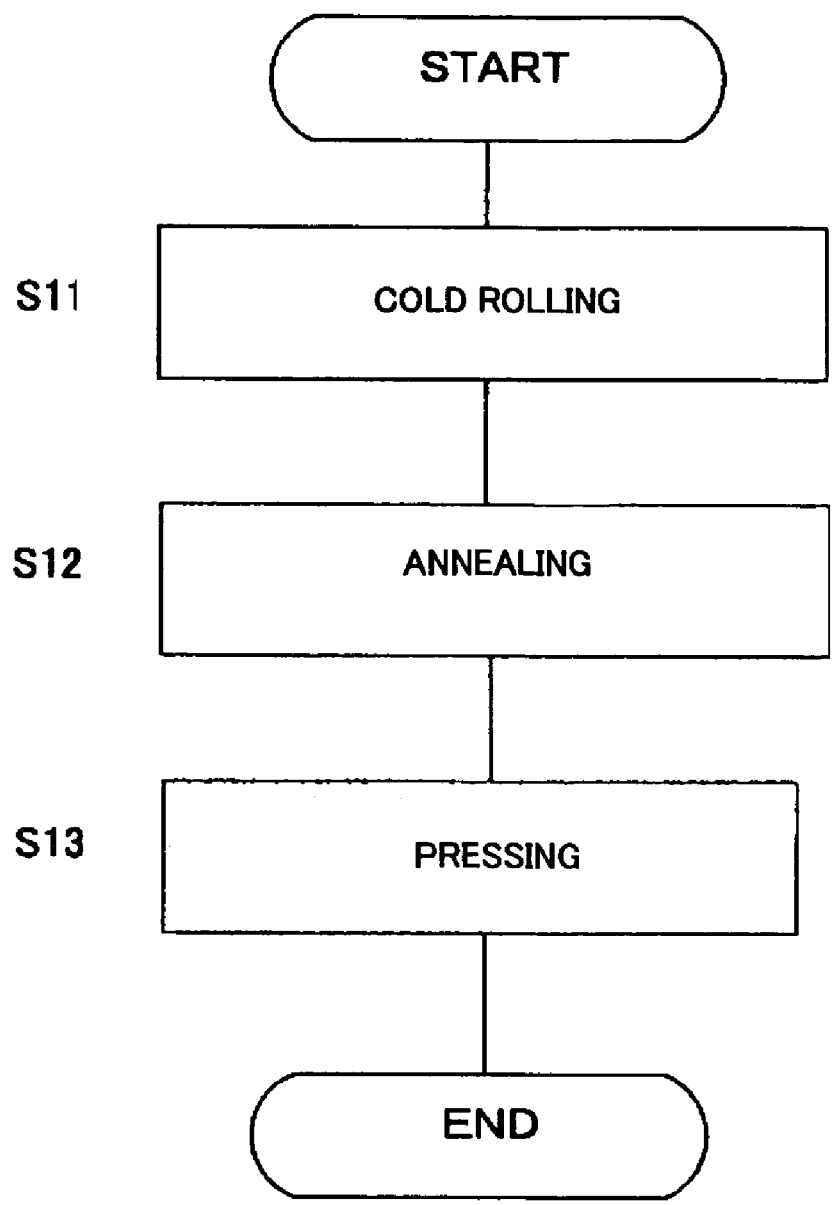
FIG. 14 is a flow chart showing a portion of a method to manufacture a plate member constituting a mounting case according to an exemplary embodiment of the present invention.

Accordingly, in the exemplary embodiment, the plate member 610 is made on the basis of the order illustrated in FIG. 14.

First, as shown in step S11 of FIG. 14, a cold rolling process is performed on an ingot of 36Ni—Fe alloy, for example. The cold rolling process is performed such that the corresponding member becomes to have a desired thickness after completing the cold rolling process on the basis of the thickness to be realized when the plate member 610 is completed. Next, as shown in step S12 of FIG. 14, an annealing process is performed on the member processed by the cold rolling process. The annealing process is a treatment to heat the member hardened by the cold rolling process to below a transformation point and above a re-crystallization temperature, thereby softening the member. According to this process, the member becomes easily processed. As shown in step S13 of FIG. 14, a press process is performed on the member which became easily processed.

As described above, in an exemplary embodiment of the present invention, by performing the annealing first, it becomes possible to subject an Ni—Fe alloy, known as a difficult material to process, to the press work relatively easily. Also, by performing the press processing, the form of the member can be controlled more accurately, for example, in comparison with a case in which the plate member 610 is formed by a sintering process and the like. Also, the plate member 610 can be formed more cheaply.

The present invention is not limited to the aforementioned exemplary embodiments, but can be modified without departing from the scope and spirit of the present invention obtained by the claims and the teachings of the specification and the accompanying drawings. Such modified electro-optical devices encased in a mounting case, projection display apparatuses, mounting cases, and manufacturing methods thereof also belong to the technical scope of the present invention. The electro-optical device includes an electrophoresis apparatus, an electroluiminescent apparatus, a plasma display apparatus, and an apparatus using an electron-emitting device, such as a field emission display apparatus, and a surface-conduction electron-emitter display apparatus as well as a liquid crystal panel.

What is claimed is:

1. An electro-optical apparatus, comprising:
   an electro-optical device encased in a mounting case and having a substrate in which projection light from a light source is incident on an image display region, and
   the mounting case including a plate disposed to face one surface of the electro-optical device and a cover to cover the electro-optical device, a portion of the cover abutting against the plate, the mounting case accommodating the electro-optical device by holding at least a portion of a peripheral region positioned at the periphery of the image display region of the electro-optical device with at least one of the plate and the cover, the plate having a coefficient of linear expansion within a predetermined range on the basis of the coefficient of linear expansion of the substrate.

2. The electro-optical apparatus according to claim 1, the predetermined range being $\pm 5 \times 10^{-6}[/° C.]$.

3. The electro-optical apparatus according to claim 1, the plate being made of an alloy containing at least iron and nickel.

4. The electro-optical apparatus according to claim 1, the plate being formed by press processing.

5. The electro-optical apparatus according to claim 4, the plate being annealed before the press processing.

6. The electro-optical apparatus according to claim 1, a light emitting surface of the plate being black.

7. The electro-optical apparatus according to claim 1, the substrate including a pair of substrates to hold an electro-optic material therebetween and at least one dustproof substrate provided in one of the pair of substrates on the surface not facing the electro-optic material.

8. A projection display apparatus, comprising:
the electro-optical apparatus according to claim 1;
the light source;
an optical system to guide the projection light into the electro-optical device; and
a projection optical system to project the light emitted from the electro-optical device.

9. A mounting case, comprising:
a plate disposed to face one surface of an electro-optical device having a substrate in which projection light from a light source is incident on an image display region, and
a cover to cover the electro-optical device, a portion of the cover abutting against the plate,
the mounting case accommodating the electro-optical device by holding at least a portion of the peripheral region positioned at the periphery of the image display region of the electro-optical device, and
the plate having a coefficient of linear expansion within a predetermined range on the basis of the coefficient of linear expansion of the substrate.

10. A method to manufacture a plate of a mounting case, including a plate disposed to face one surface of an electro-optical device in which projection light from a light source is incident on an image display region, and a cover to cover the electro-optical device, a portion of the cover abutting against the plate, the mounting case accommodating the electro-optical device by holding at least a portion of the peripheral region positioned at the periphery of the image display region of the electro-optical device, the method comprising:
annealing an original plate to be used as the plate by heating the original plate to a predetermined temperature, and
pressing the original plate after the annealing step.

* * * * *